(No Model.)
L. C. BRYAN.
DENTAL INSTRUMENT.
No. 416,989. Patented Dec. 10, 1889.
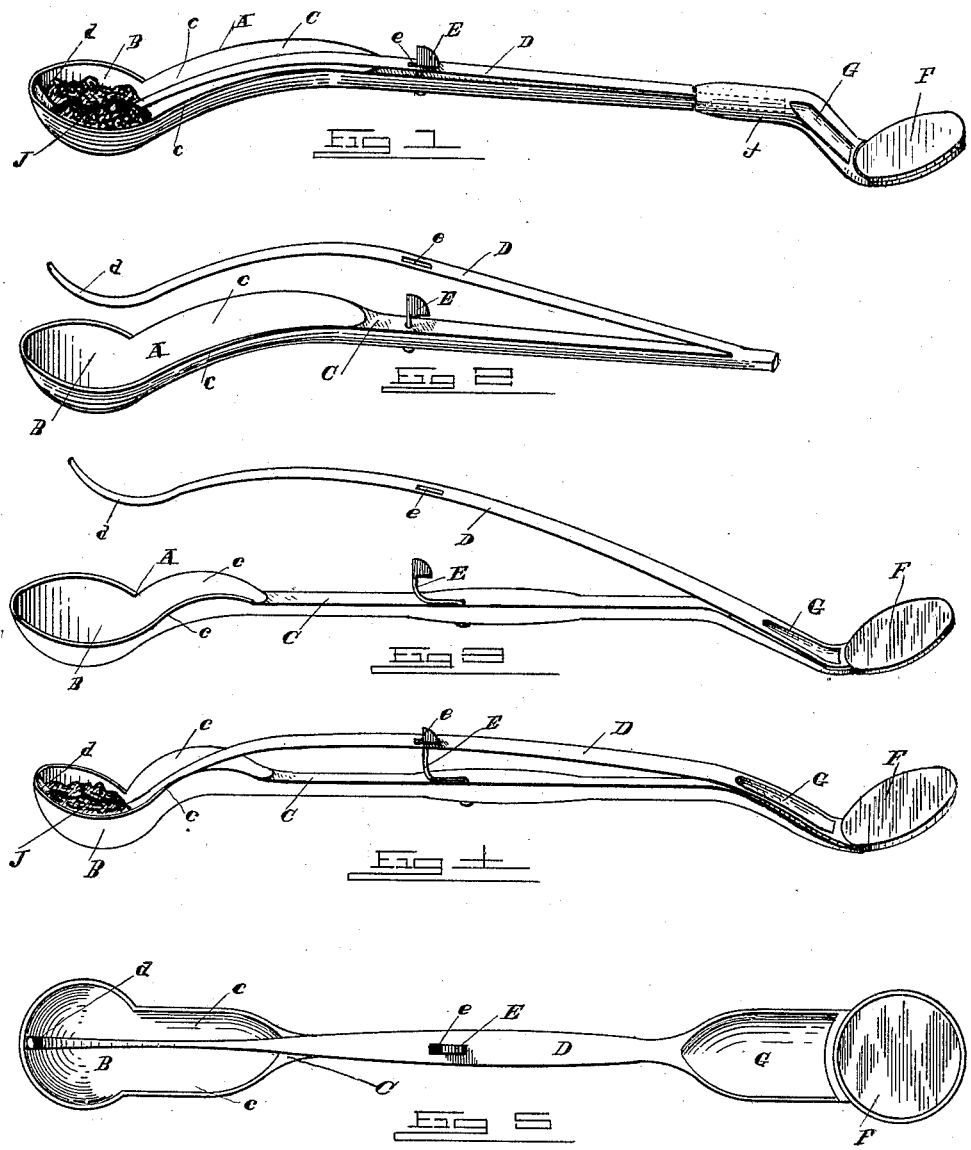

UNITED STATES PATENT OFFICE.

LYMAN CURTIS BRYAN, OF BASLE, SWITZERLAND.

DENTAL INSTRUMENT.

SPECIFICATION forming part of Letters Patent No. 416,989, dated December 10, 1889.

Application filed May 21, 1889. Serial No. 311,633. (No model.)

*To all whom it may concern:*

Be it known that I, LYMAN CURTIS BRYAN, of Basle, Switzerland, have invented certain new and useful Improvements in Dental Instruments; and I do hereby declare that the following is a full, clear, and exact description thereof, reference being had to the accompanying drawings, and to the letters of reference marked thereon, which form part of this specification, in which—

Figure 1 is a perspective view of my improved dental tool showing the sponge secured thereto. Fig. 2 is a similar view with the sponge and mirror removed. Figs. 3 and 4 are perspective side views of a modified form of the instrument, and Fig. 5 is a top plan view thereof.

This invention is an improvement in dental implements; and its object is to provide a tool which may be used as a speculum, as a tongue and lip shield or holder, as a holder for a sponge to cool revolving burrs or wheel-disks used in grinding the teeth or fillings or polishing disks within the mouth of the patient, and as a holder for amalgams and fillings, and to catch waste grit, &c., produced in the operations on the teeth.

To these ends the invention consists in the novel implement and novel arrangement of parts connected therewith, as is hereinafter clearly specified.

Referring by letters to the drawings, A designates a spoon-shaped piece of metal, preferably made of or plated with a bright non-corrosive metal. This piece has a hemispherical bulb or bowl B at one end and a curved handle portion C, which is concaved on its upper face near bowl B, and has lateral wings or extensions c c, that unite with the edge of the bowl, as indicated in the drawings. The handle and bowl are preferably stamped together and integral.

D designates a spring-rod, curved similarly to handle C and having an upwardly-curved end d, which rests in bowl B when the rod is depressed. The other end of the rod is riveted or otherwise secured to the opposite end of handle C.

E designates a spring-catch, secured to the upper face of handle C below rod D, and having a tooth adapted to engage a slot e in said rod and hold the latter when closed.

F designates a small mirror, similar to those ordinarily used by dentists, and mounted on a proper backing, which is provided with a handle f, that has a widened concaved portion G adjoining said mirror and serving both as a speculum or reflector. Portion G will prevent the patient's lips, teeth, or tongue interfering with the mirror and concentrates light thereon, as is evident. This mirror is preferably made removable, the handle f having a socket in it which fits upon the united ends of piece A and rod D, the latter being properly finished to engage therewith, so that the mirror can be readily attached to or removed from the implement, if desired. Instead of making the mirror detachable, however, I might form the end of handle C into a mirror-support, shield, and speculum G, as indicated in Figs. 3, 4, and 5, which will be a convenient form of the implement.

A piece of sponge J of convenient size is placed in the concavity of handle C or in bowl B, as indicated in the drawings, and by depressing rod D the sponge is caught and retained in position. In polishing or cutting a tooth with a revolving disk or burr, as is the ordinary practice, the revolving tool becomes heated by friction and becomes painful to the patient. In this case I simply wet the sponge fastened to the implement and hold it in the patient's mouth in such manner that the wet sponge can lie against the revolving tool, which it cools. The concaved portion of the handle and bowl will hold back and keep the lips and tongue out of the way of the tool and shield them from injury, and the sponge will catch the filings cut from the tooth or filling, and it will clear the burr and retain the particles cut away, and in the case of gold fillings the sponges can be dried and burned and the gold particles recovered. The shape of the handle is such that the patient's lips are distended by the bowl or wings c c, and light is reflected into the mouth thereby. In filling teeth with plastic fillings the amalgam or cement can be held in the bowl of the instrument in convenient position for use, while the tongue and lips are kept out of the way. Where rubber dams are used, the tooth and dam can be partly covered by the bowl and the revolving disk operated through the concaved portion of the handle, thus protecting the rubber dam and keeping it out of the way.

The adaptability of the tool for use in the manner and for the various purposes described constitute it a valuable and convenient implement for dentists and in diseases of the mouth and throat.

The filling material is prepared in convenient-sized pieces to slip into the tooth-cavity, and are conveyed to the mouth of the cavity by the implement. Now, with a suitable instrument, preferably a dental pliers, the pieces are successively pushed up the sloping sides of the bowl and directed into the cavity. In packing the filling into the cavity the bowl becomes a receptacle to catch the fractured pieces, which are again directed into the cavity until it is filled.

Polishing and grinding powders may be applied to the moist sponge and conveyed to polishing-wheels of suitable material for use on the teeth or filling.

Having thus described my invention, what I claim as new is—

1. A dental shield consisting of a spoon-shaped piece of metal having a bowl at one end, and a curved handle having a concaved and widened portion adjoining the bowl, substantially as described.

2. The combination of the spoon-shaped piece having a bowl at one end, with a curved spring-bar attached thereto, substantially as and for the purpose specified.

3. A dental implement consisting of a spoon-shaped piece of metal having a bowl at one end and a mirror at the opposite end, substantially as set forth.

4. The herein-described dental implement, consisting of a handle having its ends concaved and curved, and a bowl at one end and a mirror at the other, substantially as specified.

5. The combination of the spoon-shaped piece A, having a bowl B and lateral wings c c, with the spring-bar D, secured to piece A, the catch engaging said bar, and a sponge, all constructed and arranged substantially as set forth.

In testimony that I claim the foregoing as my own I affix my signature in presence of two witnesses.

LYMAN CURTIS BRYAN.

Witnesses:
GEORGE GIFFORD,
T. G. TREFZER.